(12) United States Patent
Sanchez Casadevall

(10) Patent No.: US 10,981,194 B2
(45) Date of Patent: Apr. 20, 2021

(54) METHOD FOR MANUFACTURING AND PAINTING CHARACTERS PRESS FORMED ON LICENSE PLATES AND TUBULAR THERMAL TRANSFER FILM FOR CARRYING OUT SAID METHOD

(71) Applicant: INDUSTRIAS SAMAR'T, S.A., Girona (ES)

(72) Inventor: Enrique Sanchez Casadevall, Girona (ES)

(73) Assignee: INDUSTRIAS SAMAR'T, S.A., Girona (ES)

( * ) Notice: Subject to any disclaimer, the term of this patent is extended or adjusted under 35 U.S.C. 154(b) by 0 days.

(21) Appl. No.: 16/840,376

(22) Filed: Apr. 4, 2020

(65) Prior Publication Data
US 2020/0316641 A1    Oct. 8, 2020

(30) Foreign Application Priority Data
Apr. 8, 2019 (ES) .................................. 201930319

(51) Int. Cl.
*B05D 1/28* (2006.01)
(52) U.S. Cl.
CPC ..................... *B05D 1/28* (2013.01)
(58) Field of Classification Search
CPC .......... B05D 1/28; B05D 1/286; B60R 13/10; B60R 13/105
See application file for complete search history.

(56) References Cited

U.S. PATENT DOCUMENTS

| 5,308,426 A * | 5/1994 | Claveau | B41M 5/035 156/230 |
| 5,962,368 A * | 10/1999 | Poole | B41M 5/0353 156/235 |
| 2002/0148054 A1* | 10/2002 | Drake | D06P 5/004 8/509 |
| 2018/0243781 A1* | 8/2018 | Buerger | B44B 5/009 |

FOREIGN PATENT DOCUMENTS

| DE | 3741232 A1 * | 6/1989 |
| ES | 2613046 * | 5/2017 |
| ES | 2645194 * | 12/2017 |
| ES | 2645194 A1 | 12/2017 |
| JP | 04214392 A * | 8/1992 |

* cited by examiner

*Primary Examiner* — Nathan H Empie
(74) *Attorney, Agent, or Firm* — Höglund & Pamias, PSC; Roberto J. Rios

(57) ABSTRACT

The present invention relates to a method for manufacturing and painting characters press formed on license plates and to a tubular thermal-transfer film for carrying out said method which comprises: a step of press forming identifying characters (2) on an aluminum plate (1) with a reflective film (3), including a perimetral edge (4) or not, by means of using a hand- or motor-operated press forming machine or device; and a step of thermal stamping for painting the press formed characters (2) by means of thermal-transfer ink impregnated in a thermal-transfer film with a thermal stamping machine (6) which in turn comprises: introducing the plate (1) in a tubular thermal-transfer film (5), closing the open end or ends (5*d*) of said tubular film (5), introducing the assembly (5, 1) in the thermal stamping machine (6), and removing the finished plate (1) from inside the tubular film (5).

16 Claims, 3 Drawing Sheets

METHOD FOR MANUFACTURING AND PAINTING CHARACTERS PRESS FORMED ON LICENSE PLATES AND TUBULAR THERMAL TRANSFER FILM FOR CARRYING OUT SAID METHOD

OBJECT OF THE INVENTION

As expressed in the title of the present specification, the invention relates to a method for manufacturing and painting characters press formed on license plates and to a tubular thermal-transfer film for carrying out said method, providing advantages and features that will be described in detail below and entail an improvement over the current state of the art.

More specifically, the object of the invention focuses on a method for manufacturing license plates, particularly for performing the step of painting the characters press formed by way of embossment by means of the application of thermal-transfer ink through a tubular film which greatly facilitates said operation, and accordingly makes the license plate manufacturing process more economical, a second aspect of the present invention being said tubular film with thermal-transfer ink.

FIELD OF THE INVENTION

The field of application of the present invention is comprised within the sector of the industry dedicated to the manufacture of license plates, particularly license plates for vehicles, focusing particularly on license plates.

BACKGROUND OF THE INVENTION

As is known, one of the most common methods applied for manufacturing license plates comprises at least one step of press forming the identifying characters on the reflective aluminum plate which is a starting material, often times with a perimetral edge being press formed at the same time, where all this can be carried out with any of the hand- or motor operated machines or devices with press forming dies existing on the market, and at least another step of thermal stamping in which the upper part of the embossment obtained in the previous step of press forming said characters, and where applicable the perimetral edge, is painted by means of the application of thermal-transfer ink impregnated in a film which is placed on the already press formed plate, through a thermal stamping machine which applies pressure and heat in a controlled manner to said assembly of press formed plate and film with ink.

The problem of this method lies in the difficulty of said thermal stamping step as it requires fitting the film with thermal-transfer ink on the press formed plate given that, up until now, said film has exactly the same measurement as the plate to enable readily moving same into the groove between the rollers of the stamping machine, because a wider film may get caught and become wrinkled, deteriorating printing quality, and furthermore a film that juts out on the perimeter thereof may be stained with ink from said rollers, whereby constant cleaning is necessary. Furthermore, if it has a smaller dimension, parts of the embossment would logically be left unpainted, resulting subsequently in a defective plate.

Accordingly, the current method for manufacturing plates of this type requires, in addition to a skillful operator to perfectly align the film with thermal-transfer ink on the press formed plate, putting in the time required for carrying out said alignment properly without the ink deteriorating due to the friction generated in repeated attempts which moreover entail an expenditure in discarded material.

An example of the prior art can be found in document ES 2645194 A1 relating to a method for manufacturing license plates and belonging to the present applicant.

The objective of the present invention is therefore to provide a method which, through the use of a tubular film instead of the film having the same dimension as that of the plate, allows eliminating said difficulty in the thermal stamping step and placing the film with thermal-transfer ink on the press formed plate in a manner that is much quicker and simpler which furthermore assures proper placement on the first attempt in all cases, preventing material wastage.

Moreover and as a reference to the current state of the art, it must be pointed out that at least as far as the applicant is aware, there is no other method for manufacturing license plates or any tubular thermal-transfer film for carrying out said method, or any other invention of similar application having technical, structural, and constitutive features similar or identical to the features of the invention herein claimed.

SUMMARY OF THE INVENTION

The method for manufacturing and painting characters press formed on license plates and the tubular thermal-transfer film for carrying out the method proposed by the invention allow satisfactorily achieving the objectives indicated above, the characterizing details thereof which make it possible and distinguish it being conveniently listed in the final claims appended to the present description.

More specifically, as described above, the method proposed by the invention is a method which comprises, in a known manner:

at least one step of press forming identifying characters on an aluminum plate incorporating on the front face thereof a film made of a reflective material, where the simultaneous press forming of a perimetral edge may or may not be contemplated, said press forming being performed with any type of existing hand- or motor-operated press forming machine or device; and at least one step of thermal stamping for painting the upper part of the embossment obtained in the previous step of press forming the characters, and where applicable the perimetral edge, by means of the application of thermal-transfer ink impregnated in a film on the already press formed plate, through a thermal stamping machine with rollers applying pressure and heat in a controlled manner to said assembly of press formed plate and film with ink.

Furthermore, in an innovative and advantageous manner the method of the invention is distinguished by the fact that in the described step of thermal stamping for painting the upper part of the embossed characters, and where applicable the perimetral edge, the application of the thermal-transfer ink impregnated in the film on the already press formed plate is carried out in the following phases:

introducing the plate in a tubular film constituting said film impregnated with thermal-transfer ink, closing the open end or ends of said tubular film, introducing the assembly of tubular film with the plate arranged therein in the stamping machine, and removing the finished plate from inside the tubular film.

The difficulty of having to accurately fit the edges of a film with ink with respect to the edges of the plate is thereby avoided because, as it is a tubular film in which the plate is introduced internally, the fit is always perfect.

In turn and in order to be able to suitably carry out said method, the mentioned tubular film is formed by two laminar layers, an upper laminar layer and another lower laminar layer, attached to one another along their respective sides, and internally incorporates the thermal-transfer ink in at least the inner wall of the upper laminar layer, such that it will be in direct contact with the upper face of the press formed plate.

Preferably, these two laminar layers have a width similar to the width of the plate to be manufactured, specifically a width that is slightly greater, and more specifically just wide enough for the plate to readily fit therein but without too much play, so as to allow readily introducing the assembly between the rollers of the stamping machine.

Preferably, the tubular film furthermore has a bag configuration and, in addition to being attached laterally, said two upper and lower laminar layers forming the film are also attached at one of their ends, facilitating the proper placement of the plate arranged therein as it abuts with said end.

Preferably, the tubular film also has closure means either for closing both ends if it is not in the form of a bag or for closing the open end of said bag, said means consisting of an adhesive, facilitating the immobilization of the plate inside the bag during the stamping process.

BRIEF DESCRIPTION OF THE DRAWINGS

To complement the description that is being made and for the purpose of helping to better understand the features of the invention, a set of drawings is attached to the present specification as an integral part thereof in which the following has been depicted with an illustrative and non-limiting character.

DETAILED DESCRIPTION OF THE INVENTION

Figure 1:
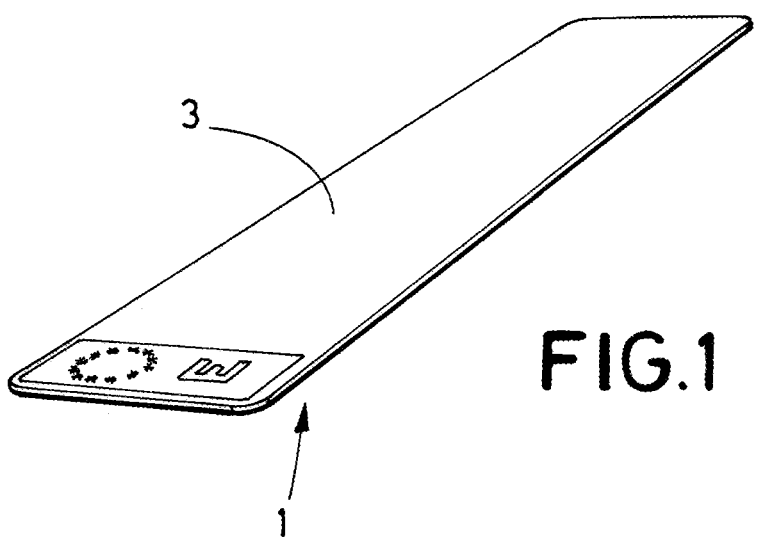
FIG. 1 shows a perspective view of the aluminum plate which is a starting material for the step of press forming.
Figure 2:
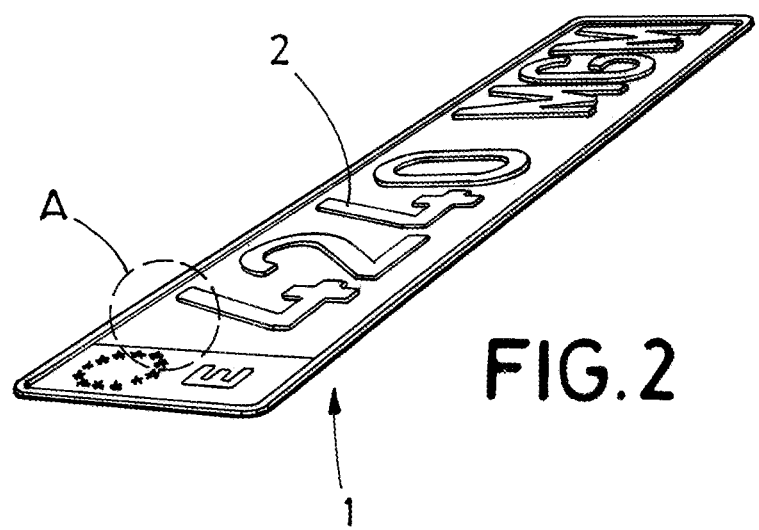
FIG. 2 shows a perspective view of the plate after the step of press forming the characters and, in this example, the perimetral edge.
Figure 3:
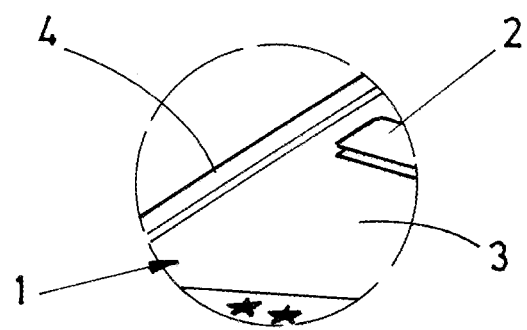
FIG. 3 shows an enlarged view of detail A indicated in FIG. 2, which allows observing the perimetral edge press formed on the plate.
Figure 4:
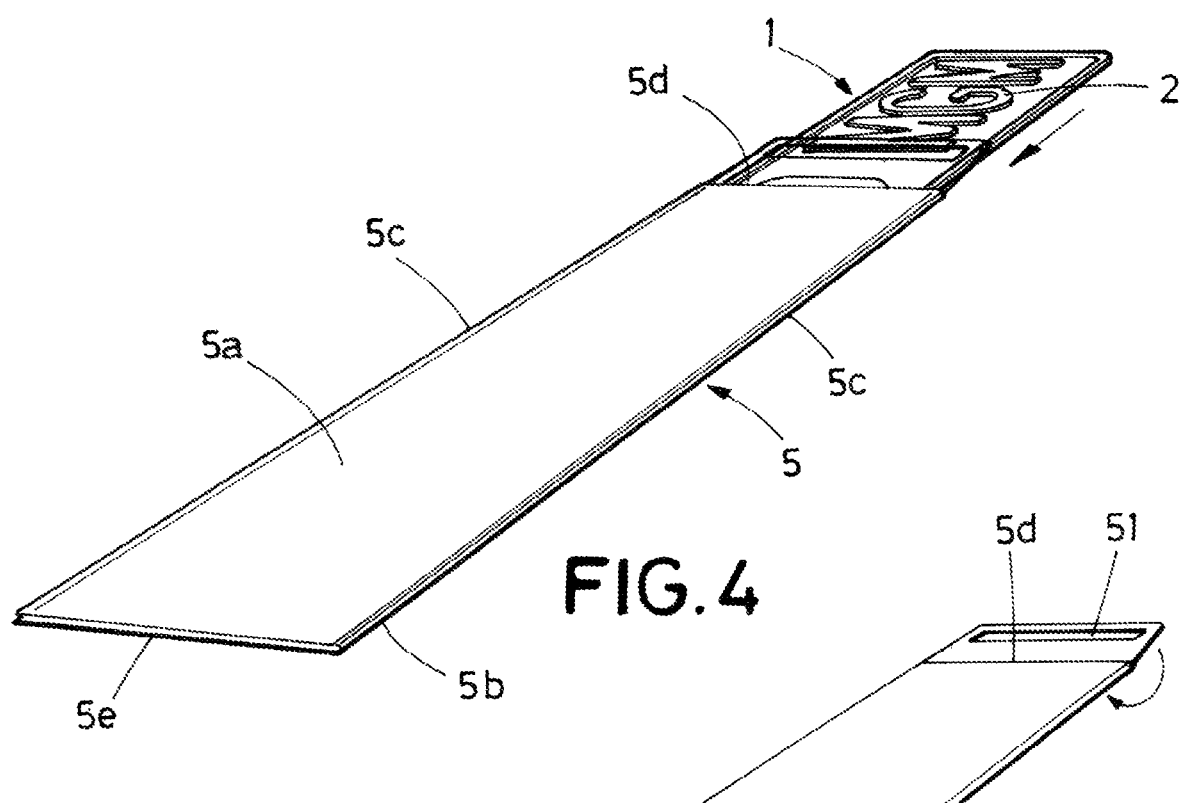
FIGS. 4, 5, and 6 show respective perspective views of the press formed plate in the phases in which the plate is introduced in the tubular film with thermal-transfer ink and the end thereof is closed.
Figure 5:
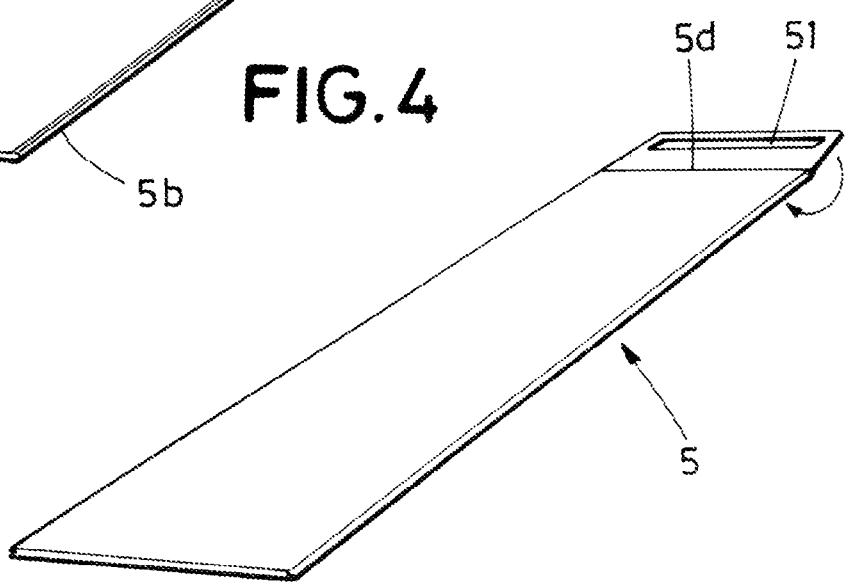
Figure 6:
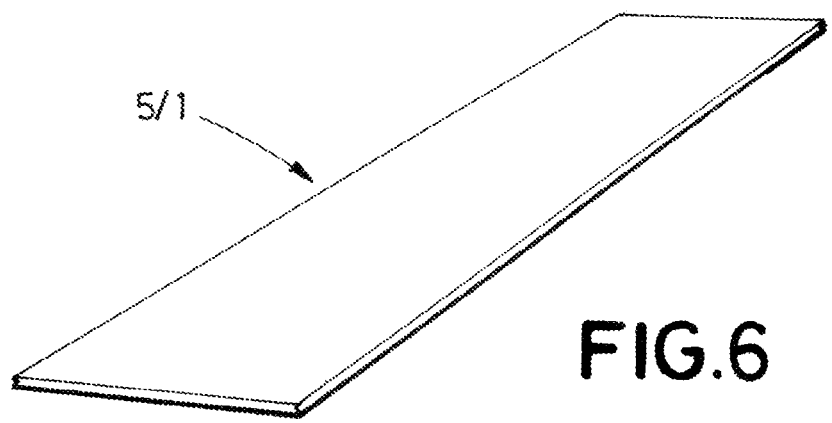
Figure 7:
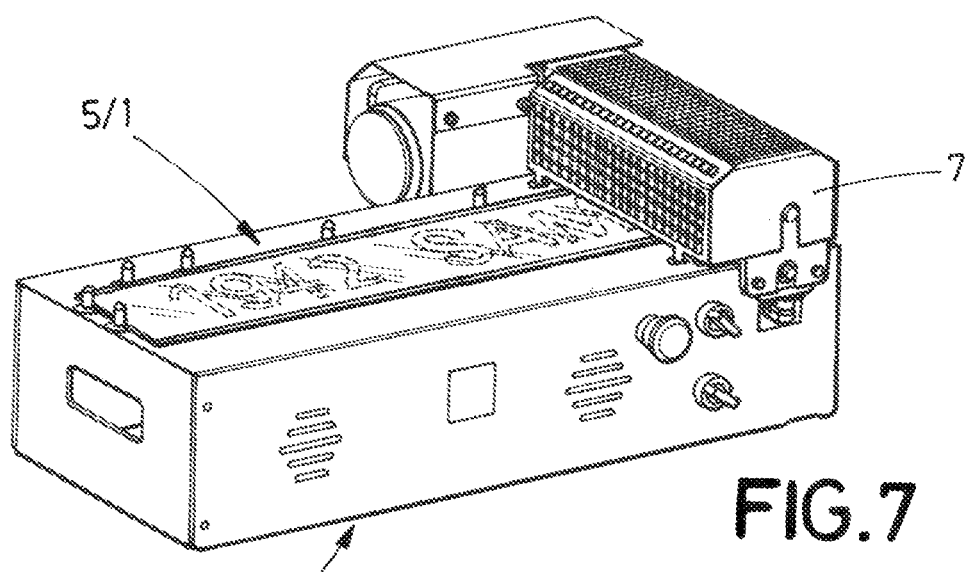
FIGS. 7 and 8 show respective perspective views of the plate in the phases in which the assembly of the tubular film and plate located therein is introduced in the thermal stamping machine, where the insertion thereof between the rollers of said machine can be seen.
Figure 8:
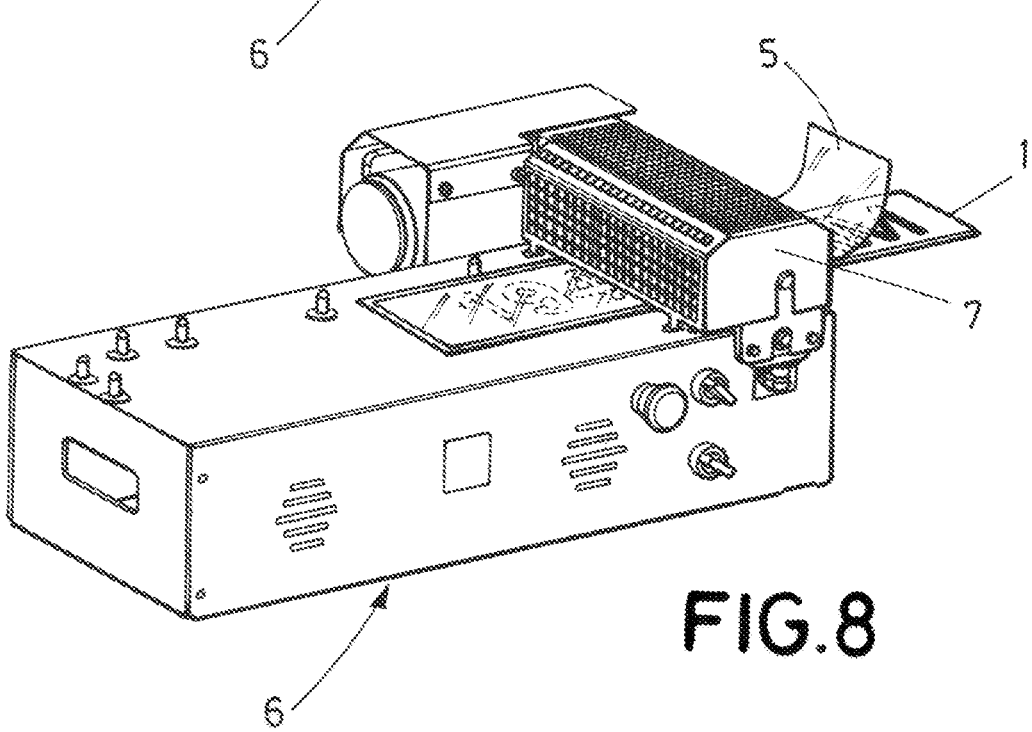
Figure 9:
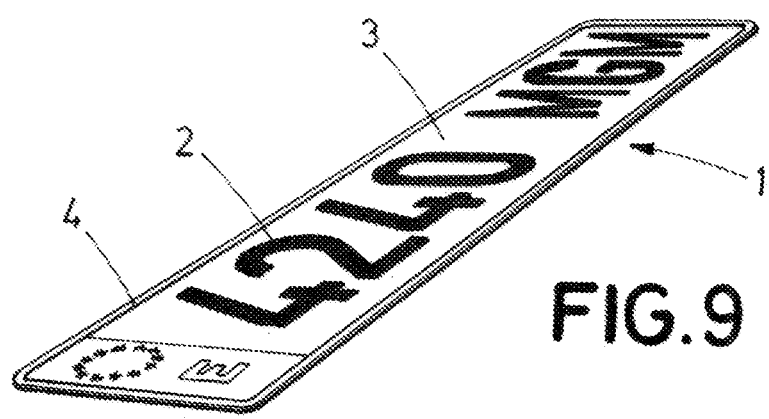
FIG. 9 shows a perspective view of the plate once completed, with the characters painted.

In view of the mentioned drawings and according to the numbering used, the method according to the invention for manufacturing and painting characters (2) press formed on a license plate (1) can be seen therein, which method comprises:

at least one step of press forming said identifying characters (2) on an aluminum plate (1) which is a starting material (FIG. 1) provided on the front face thereof with a reflective film (3), including the simultaneous press forming of a perimetral edge (4) or not (FIGS. 2 and 3), by means of using a hand- or motor-operated press forming machine or device; and at least one step of thermal stamping which paints the upper part of the embossed characters (2) press formed on the plate (1), and where applicable the perimetral edge (4), by means of the application of thermal-transfer ink impregnated in a thermal-transfer film placed on the already press formed plate (1) and with a thermal stamping machine (6) provided with rollers (7) applying pressure and heat in a controlled manner to said assembly of press formed plate (1) and film (5) with thermal-transfer ink, wherein this step of thermal stamping for painting the upper part of the embossed characters (2), and where applicable the perimetral edge (4), comprises in an innovative manner the following phases:

introducing the plate (1) in a tubular film (5) constituting said thermal-transfer film (FIG. 4), closing the open end or ends (5d) of said tubular film (5) (FIG. 5), introducing the assembly (5, 1), i.e., the tubular film (5) and the plate (1) arranged therein, in the thermal stamping machine (6) (FIG. 7), and removing the finished plate (1) from inside the tubular film (5) (FIGS. 8 and 9).

Said tubular film (5) is in turn formed by two laminar layers, an upper laminar layer (5a) and another lower laminar layer (5b), attached to one another along their respective sides (5c), and internally incorporates the thermal-transfer ink in at least the inner wall of the upper laminar layer, such that it is in direct contact with the upper face of the press formed plate (1) introduced therein.

Preferably, both laminar layers (5a, 5b) have a width (a) that is slightly greater than the plate (1) so it readily fits therein without much play, and the assembly of both elements (5, 1) readily fits between the rollers (7) of the thermal stamping machine (6).

Preferably, the tubular film (5) is a bag, such that the two upper and lower laminar layers (5a) and (5b) forming same are attached to one another along their respective sides (5c) and at one of their ends defining a closed end (5e).

Preferably, the tubular film (5) comprises closure means (51), preferably consisting of an adhesive strip, at the open end or ends (5d) thereof.

Having sufficiently described the nature of the present invention as well as the way of putting it into practice, it is not considered necessary to further describe the invention so that a person skilled in the art can comprehend the scope thereof and the advantages derived from it, stating that within its essential nature, the present invention could be carried out to practice in other embodiments differing in detail from that indicated by way of example, and such embodiments would also be granted the protection that is sought provided that the fundamental principle thereof is not altered, changed or modified.

The invention claimed is:

1. A method for painting characters pressed-formed on license plates, the method comprising:

introducing into a thermal stamping machine (6) a thermal-transfer tubular film (5) with thermal-transfer ink impregnated thereon, wherein a plate (1) with embossed characters (2) is contained inside said thermal-transfer tubular film (5);

applying pressure and heat to said thermal-transfer tubular film (5) with rollers (7) provided on said thermal stamping machine (6); and removing said plate (1) from said thermal-transfer tubular film (5), wherein an upper part of the embossed characters (2) are thermally painted with said thermal-transfer ink.

2. The method of claim 1, wherein said thermal-transfer tubular film (5) is formed by an upper laminar layer (5a) and a lower laminar layer (5b) attached along their sides (5c), said thermal-transfer ink is provided in at least an inner wall of the upper laminar layer so that said inner wall is in direct contact with the upper part of said embossed characters (2).

3. The method of claim 2, wherein said upper and lower laminar layers (5a, 5b) have a width (a) greater than the width of said plate (1) so that the plate (1) fits inside the thermal-transfer tubular film (5) which fits between the rollers (7) of the thermal stamping machine (6).

4. The method of claim 2, wherein said thermal-transfer tubular film (5) is a bag having a closed end (5e) at one end thereof.

5. The method of claim 4, wherein closure means (51) are provided on said closed end (5e).

6. The method of claim 5, wherein said closure means (51) comprises an adhesive.

7. The method of claim 1, wherein said plate (1) is made from aluminum.

8. The method of claim 1, wherein said plate (1) is provided with a reflective film (3) on a front face of said plate (1).

9. The method of claim 1, wherein said plate (1) further comprises a perimetral edge (4).

10. The method of claim 9, wherein said perimetral edge (4) is thermally painted with said thermal-transfer ink.

11. The method of claim 9, wherein the perimetral edge (4) is pressed formed on said plate (1) by a manual press forming machine.

12. The method of claim 9, wherein the perimetral edge (4) is pressed formed on said plate (1) by a motor-operated press forming machine.

13. The method of claim 1, wherein the embossed characters (2) are pressed formed on said plate (1) prior to introducing the thermal-transfer tubular film (5) into said thermal stamping machine (6).

14. The method of claim 13, wherein a perimetral edge (4) is simultaneous pressed formed with said embossed characters (2).

15. The method of claim 1, wherein the embossed characters (2) are pressed formed on said plate (1) by a manual press forming machine.

16. The method of claim 1, wherein the embossed characters (2) are pressed formed on said plate (1) by a motor-operated press forming machine.

* * * * *